(12) United States Patent
Griessbaum et al.

(10) Patent No.: US 6,750,657 B2
(45) Date of Patent: Jun. 15, 2004

(54) COMBINATION OF A FEEDTHROUGH ELEMENT FOR AN ELECTRIC HIGH-FREQUENCY SIGNAL AND A PROBE, AND A LEVEL METER METERING DEVICE INCLUDING A COMBINATION OF THIS TYPE

(75) Inventors: Karl Griessbaum, Muhlenbach (DE); Josef Fehrenbach, Haslach (DE); Jurgen Motzer, Gengenbach (DE)

(73) Assignee: VEGA Grieshaber KG (DE)

( * ) Notice: Subject to any disclaimer, the term of this patent is extended or adjusted under 35 U.S.C. 154(b) by 0 days.

(21) Appl. No.: 09/989,089

(22) Filed: Nov. 19, 2001

(65) Prior Publication Data

US 2002/0121907 A1 Sep. 5, 2002

Related U.S. Application Data

(60) Provisional application No. 60/274,713, filed on Mar. 12, 2001.

(30) Foreign Application Priority Data

Nov. 23, 2000 (DE) .......................... 100 58 026

(51) Int. Cl.⁷ .............................................. G01R 27/32
(52) U.S. Cl. ...................................................... 324/642
(58) Field of Search ................................. 324/642, 643, 324/644, 635, 637, 696, 533; 73/866.5, 290, 304 R, 204.22; 333/254–261, 346, 252; 343/872, 753; 524/442; 342/124

(56) References Cited

U.S. PATENT DOCUMENTS

| | | | |
|---|---|---|---|
| 4,786,857 A | 11/1988 | Mohr et al. | 324/58.5 B |
| 5,726,578 A | * 3/1998 | Hook | 324/643 |
| 5,943,908 A | 8/1999 | Innes et al. | |
| 5,955,684 A | 9/1999 | Gravel et al. | |
| 6,019,007 A | 2/2000 | Grieger et al. | |
| 6,062,095 A | 5/2000 | Mulrooney et al. | |
| 6,118,282 A | 9/2000 | Grieger | |
| 6,155,112 A | 12/2000 | Eckert et al. | 73/290 V |
| 6,276,199 B1 | 8/2001 | Eckert et al. | 73/290 V |
| 6,386,055 B1 | * 5/2002 | Eason | 73/866.5 |

FOREIGN PATENT DOCUMENTS

| | | | |
|---|---|---|---|
| DE | 4404745 | 8/1995 | G01F/23/28 |
| EP | 0773433 | 5/1997 | G01F/23/284 |
| EP | 0780664 | 6/1997 | G01F/23/284 |
| EP | 0834722 | 4/1998 | G01F/23/284 |
| EP | 0922942 | 6/1999 | G01F/23/284 |
| EP | 0 928 955 A2 | 7/1999 | |
| EP | 1 083 414 A1 | 3/2001 | |
| EP | 0 534 654 A2 | 3/2003 | |
| WO | 98/25109 | 6/1998 | |

OTHER PUBLICATIONS

Meinke, H.., *Taschenbuch der Hochfrequenztechnik*, (1968), 346–347.

* cited by examiner

*Primary Examiner*—N. Le
*Assistant Examiner*—Amy He
(74) *Attorney, Agent, or Firm*—Schwegman, Lundberg, Woessner & Kluth, P.A.; Timothy Elise

(57) ABSTRACT

A combination includes a feedthrough element for an electric high-frequency signal in a TDR level metering device, and a probe for guiding the high-frequency signal from the feedthrough element to the filling product surface of a filling product to be measured and back. The feedthrough element includes at least one guiding element (6), into which the electric high-frequency signal is to be fed at an inlet point (10), and which transmits at an outlet point (17) the electric high-frequency signal to a probe (7) adapted to guide the high-frequency signal, a one-part or multipart mechanical carrier element (1), and a one-part or multipart insulation (11, 12) present between the carrier element (1) and the guiding element (6). In the combination the impedance of the feedthrough element and the impedance of the probe (7) following the outlet point (17) are substantially matched to each other at the outlet point (17).

55 Claims, 8 Drawing Sheets

Figure 1:
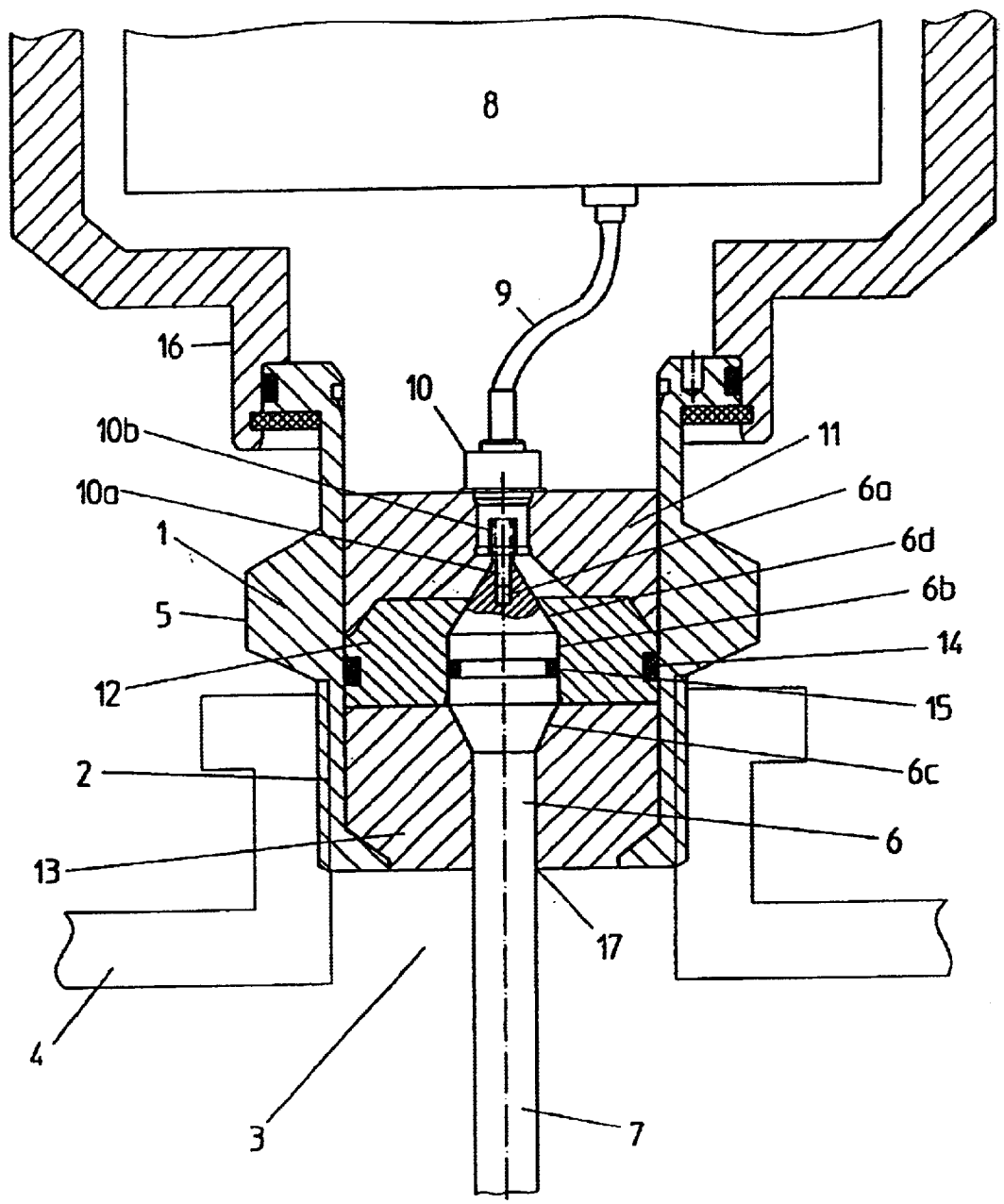

— — interfering echo
——— useful echo

COMBINATION OF A FEEDTHROUGH ELEMENT FOR AN ELECTRIC HIGH-FREQUENCY SIGNAL AND A PROBE, AND A LEVEL METER METERING DEVICE INCLUDING A COMBINATION OF THIS TYPE

This application claims the benefit of Provisional application No. 60/274,713 filed Mar. 12, 2001.

TECHNICAL FIELD

The invention relates to a combination of a feedthrough element for an electric high-frequency signal and a probe for guiding said high-frequency signal—as it is, for example, generated in a level metering device and evaluated after reflection at a filling product surface to be monitored—to the filling product surface and back from there. The feedthrough element comprises a guiding element, into which the electric high-frequency signal is to be fed at an inlet point, and which transmits the electric high-frequency signal to the probe at an outlet point. Moreover, the feedthrough element comprises a one-part or multipart mechanical carrier element. A one-part or multipart insulation is present between the carrier element and the guiding element. The invention further relates to level metering devices (TDR devices) working on the principle of transit or propagation time measurement of guided electromagnetic waves and being equipped with a feedthrough of the aforementioned type.

PRIOR ART

For level metering operations, measurement systems are used, which determine the distance from the filling product on the basis of the measured transit time of electromagnetic waves from a level metering device mounted in the receptacle cover to the surface of the filling product and back. The required level can be calculated when the receptacle height is known. Such sensors known under the technical designation of level radar, are all based on the property of electromagnetic waves of propagating within a homogenous non-guiding medium at a constant speed, and of being at least in part reflected at the boundary surface of various media. Each boundary layer of two media having various dielectric constants, generates a radar echo upon impingement of the wave. The greater the difference between the two dielectric constants, the more the impedance level of the wave propagation changes, and the stronger is the echo to be observed.

Various radar principles are known for determining the required wave propagation time. The two mainly used methods are the pulse-time delay method (pulse radar), for one, and the frequency-modulated continuous wave method (FMCW radar), for another. The pulse radar uses the pulse-shaped amplitude modulation of the wave to be emitted, and assesses the direct time interval between emission and reception of the pulses. The FMCW radar determines the transit time in an indirect way by emitting a frequency-modulated signal and by differentiating between emitted and received instantaneous frequency.

Apart from the various radar principles, various frequency ranges of the electromagnetic waves are used, as well, depending on the respective application. Thus, for example, pulse radars exist having carrier frequencies in the range from 5 to 30 GHz, and in addition likewise those working in the base band as so-called monopulse radar without carrier frequency.

A series of methods and devices is moreover known for guiding the electromagnetic wave to the surface of the filling product and back. Thereby, the basic difference is made between a wave radiated into the space and a wave guided through a line. A level measuring apparatus in which microwaves are fed via a coaxial line into an antenna meant for radiating electromagnetic waves is known from EP 0 834 722 A2. Here, the antenna is configured in two parts. One antenna part in the form of a solid cylinder consists of a dielectric material and is shrouded by a metal sleeve. The microwave is fed in at one end of the solid cylinder of a dielectric material, while at the other end ensues the transmission to the radiating end of the antenna. The metal sleeve extends over the antenna zone configured as a solid cylinder and being present in the zone of a neck of a vessel containing the filling product. This antenna structure, in particular the configuration within the neck of the vessel, therewith constitutes a filled waveguide for transferring the high-frequency signal or the wave into the antenna zone meant for radiation. This structure has the effect that the antenna, in the zone of the attachment of the measuring apparatus—hence in that part of the antenna situated in the zone of the neck—does not transmit microwaves and does not receive reflected microwaves, respectively. To avoid an impedance leap at that end of the metal sleeve facing the radiating antenna, the sleeve end is bevelled.

From EP 0 922 942 A1, a filling level measuring device with a radiating antenna is likewise known to work with microwaves. Here, the microwave fed through a coaxial cable, is introduced into an end element, which is configured with a cone at the antenna side. Following same, there is an insert of a dielectric material comprising a recess in the end element corresponding to said cone. Then from this insert of dielectric material ensues the further transmission of the microwave to the radiating antenna parts. A higher portion of ceramic is featured in the direction facing away from the antenna than in a section arranged in the transmitting direction facing the antenna in order to achieve a quasi-continuous transition without having substantial impedance leaps.

Radar sensors exhibiting a completely different structure with respect to the feedthrough and the signal guidance, which guide the electromagnetic wave through a line (probe) to the reflection place and back, are also designated as TDR (time domain reflectometry) sensors. These sensors, as compared to those which freely radiate high-frequency waves, have a substantially lower attenuation of the reflected echo signal, since the power-flow only ensues in the constricted area in the environment along the conducting waveguide. Moreover, interfering echoes from within the receptacle, originating, for example, from the reflections of the wave at receptacle components (stirrers, tubes), and which complicate the identification of the very one echo from the surface of the filling product with freely radiating sensors, are avoided to a large extent with sensors having guided waves. This leads to the fact that level metering with guided electromagnetic waves is to a large extent independent of the receptacle construction and moreover of the product properties of the filling product or other operational conditions (e.g. dust, angle of the bulk good), and therefore leads to highly reliable measurement results.

All known leads usual for high frequency can be used as the waveguides for guiding the wave, in which the wave penetrates at least in part the medium surrounding the metallic leads or is enclosed by same. Due to their simple mechanical structure and their suitability for any filling products, i.e. bulk goods and liquids, the single-wire line or single-wire probe in particular is often used in the level metering technology. In its configuration as a rod or cable probe, it is above all insensitive to deposits and adherences of filling products. In DE 44 04 745 C2, a level metering sensor including such a probe is described as an example.

An important aspect of the TDR level metering sensors having single leads, is the input of the measurement signal from the electronic unit into the probe. Thereby, it is important that the path leading from the electronic unit to the probe, does not contain any major impedance leaps for the guided wave. Since a part of the wave is reflected by every discontinuously changing line impedance, this reflected portion, for one, is no longer available for the measurement purpose, hence the reflection at the surface of the filling product, thus causing an amplitude loss of the echo generated there. Moreover, additional interfering echoes are generated by the wave reflecting at possible line impedance variations between the electronic unit and the probe, which complicate the identification of the filling product reflection to be evaluated. This is due, in particular, to the fact that the echo interfering at the irregularity between the receptacle feedthrough and the probe extends in each case depending on the bandwidth used of the measurement signal over a distance area directly following said irregularity. With the low echoes from the filling product surface to be measured and a high interfering echo from the impedance leap at the beginning of the probe, it becomes impossible to detect and precisely measure levels reaching the upper end of the probe. Therefore, in all known TDR sensors, a minimum spacing between the filling product and the feedthrough for the signal through the receptacle wall is provided, which should not be fallen short of. Usually, this is at about 30 cm.

The line path between the electronic unit and the probe in level metering sensors consists in all cases of the mentioned feedthrough and, in addition, in most cases of a coaxial cable establishing the connection to the printed board whereon the electronic circuit for the generation of the transmitted signal and the evaluation of the reflected signal is assembled. The coaxial cable can be dispensed of in special cases when the printed board comprises a direct electrical and mechanical connection to the feedthrough.

The feedthrough serves for guiding the measurement signal from the sensor fixed at the outside of the filling product receptacle to the probe extending within the receptacle. Moreover, it has to supply a mechanical support for the probe. For this purpose, it is usually provided with a carrier element of metal, which can be secured to the receptacle, e.g. in a cover opening of same, and which mechanically supports a guiding element guiding the wave. An insulating element is disposed between the carrier element and the guiding element so as to avoid short-circuits. The guiding element connects, for one, the coaxial cable usually leading to the electronic unit and, for another, the probe mounted within the receptacle.

Feedthroughs for single-line probes are usually structured coaxially, i.e. the guiding element is coaxially surrounded by the insulating element and the carrier element. This basic structure, hence, can be technically configured in various ways, so as to comply with determined requirements such as the sealing of the receptacle atmosphere, pressures resistance, reception of high tensile forces at the probe, high temperature and resistance to aggressive receptacle atmospheres. Apart from the mechanical requirements made on the feedthrough, the electric requirement—as already mentioned—of a wave guidance without major impedance leaps has to be observed. This requirement can be complied with for the coaxial line within the feedthrough. Examples of such solutions for electrically as well as mechanically suitable feedthroughs can be found in EP 0 773 433 A1, EP 0 780 664 A2 and WO 98/25 109. All of the therein described feedthroughs furnish indications as to how the line impedance is mostly to be kept constant within the feedthrough.

No solutions can be found in these documents for matching the inevitable impedance leap between the coaxial feedthrough and the probe (also called single conductor) following same. The mentioned impedance leap is normally very distinctive and thereby particularly disturbing. The reason for this is the fact that the line impedance of a single conductor is in the order of 300Ω. With coaxial conductors, the line impedance results from the relationship of the outer conductor D to the inner conductor d and the impedance of the dielectric constants of the interposed insulating material. The more important the relationship D/d and the smaller the dielectric constant, the more important the impedance becomes. Dimension D of the outer conductor is in practice delimited towards the upper side by usual receptacle openings, dimension d of the inner conductor is delimited towards the lower side by the necessary mechanical stability of the guiding element. In toto, the line impedance is hence restricted by the pre-given delimitations of the mechanical dimensions towards higher values.

Impedance values which are simple to realize for coaxially structured feedthroughs are between 50Ω and 100Ω, and are usually so dimensioned that they carry on the impedance of the coaxial cable connecting them to the electronic unit. This means that the impedance of the coaxial feedthrough is often close to the standard values of 50Ω or 75Ω. The result from this consideration is an impedance leap at the connecting point feedthrough-single conductor of significantly more than the factor 2. The hitherto known improvement of the line matching from the feedthrough impedance to the impedance of the single conductor is, for example, described in the already mentioned DE 44 04 745 C2. By means of a matching horn following the feedthrough, the impedance level does not pass over discontinuously but passes over rather continuously from the lower value of the feedthrough to the higher value of the single conductor. The disadvantage of this solution is the space required by the horn inside the receptacle and the risk of the filling product adhering to the inside of the horn, as well as the possible damaging influences of the receptacle atmosphere on the horn.

REPRESENTATION OF THE INVENTION

The invention is based on the technical problem of providing a feedthrough for high-frequency signals in a TDR level metering device improved with respect to interfering echoes.

This technical problem is solved in a preferred embodiment by an inventive combination composed of an impedance-featuring feedthrough element for an electric high-frequency signal within a TDR level metering device, and an impedance-featuring probe for guiding the high-frequency signal to the filling product surface and back from there. The feedthrough element comprises a guiding element into which the electric high-frequency signal is to be fed at an inlet point, and which transmits the electric high-frequency signal to the probe for guiding said high-frequency signal, a one-part or multipart mechanical carrier element, and a one-part or multipart mechanical insulation present between the carrier element and the guiding element. The impedance of the feedthrough element and the impedance of the probe following the outlet point are substantially matched to each other.

An inventive combination of the initially mentioned kind is characterized in that the impedance of the feedthrough and the impedance of the probe meant for guiding and not for radiating the high-frequency signal, are for the first time substantially matched to each other at the outlet point. In contrast to prior art, the impedances at the outlet point of the feedthrough hence are given attention for the first time, and by the impedance matching in this zone, hitherto occurring interfering reflections are avoided to a large extent or at least reduced.

The novel impedance matching can be achieved, for one, in that the impedance within the feedthrough is increased by constructional measures to the higher impedance of the probe. Such inventive embodiments comprise, for example, dimension variations of various components inside of the feedthrough (cf. e.g. FIGS. 2 and 3). For another, it is yet possible, to reduce the higher impedance of the probe to the lower impedance of the feedthrough. This is achieved by adding appropriate components close to the outlet point, such as it is shown, for example, in various variations in FIGS. 6 through 8. From FIG. 9, it can moreover be seen that the two solution principles can also be combined.

According to the first solution principle, the impedance at the outlet point for being matched to the impedance of the probe following the outlet point, hence is substantially higher than the impedance at the inlet point. The impedance at the outlet point therewith is supposed to be matched to the probe impedance so as to avoid impedance leaps having the above-described disadvantages. An improvement with respect to prior art is achieved as soon as the impedance of the probe is not higher than 1.5 times the impedance of the feedthrough at the outlet point, a fact, which in the sense of the invention, is to be understood as an essential matching of the impedances. This means that, for example, under taking the aforementioned conditions of prior art as a basis, the impedance of 50Ω at the inlet point is increased to an impedance at the outlet point of 200Ω, whereby interfering reflections are substantially reduced as compared to prior art.

The invention is based on the idea of preventing for the first time an undesired impedance leap from occurring for the first time as opposed to the prior art which works with space-consuming devices connected downstream of the feedthrough, but by providing for an impedance matching in the very feedthrough at the transition (outlet point) from the feedthrough to the probe situated outside of the feedthrough. This can be performed by a suitable selection of individual component materials, a novel shaping of single or plural feedthrough components or also by elements which can be simply integrated into the feedthrough and having an impedance matching effect, such as, for example, a discrete resistor, a wave-attenuating element or a high-frequency transformer. Of course, combinations of two or more of the mentioned solution examples are possible, too.

An embodiment of the invention consists in realizing in a coaxially structured feedthrough, a match between the impedance of the connection to the electronic unit and the impedance of the probe by continuously modifying the line impedance. This can, for example, be realized by continuously modifying the ratio between the inner diameter of the carrier element and the diameter of the guiding element, in each case relative to a cutting plane perpendicular to the direction of the wave propagation. Thus, a continuous impedance modification from 50Ω to 300Ω is, for example, possible. The longer the zone of the continuous impedance modification can be construed, the more low-reflection is its effect. In the ideal case, the wave is guided from one end of the feedthrough to the other without major reflections and is not faced with major impedance changes at the connecting point to the probe, either. The variation of the diameter ratios realized continuously or, alternatively, in several stages can be achieved by a tapered shape of the guiding element, by a conical inner contour of the carrier element or by a combination of these two possibilities.

With a required minimum diameter of the guiding element and a receptacle-relative restricted outer diameter of the carrier element, however, this solution is only usable under certain conditions, since in this case, any arbitrarily high impedances cannot be realized within the feedthrough.

A further embodiment of the invention without the above-mentioned restriction consists in structuring the feedthrough not purely coaxially but to realize within the carrier element of metal a so-called two-wire line. By continuously varying the thickness and the spacing of the additional second guiding element, as well as by restricting the length of the second guiding element to the constructional length of the feedthrough, a continuous impedance increase of the circuit can be achieved despite a restricted cross section area. In this construction, only the probe having all the known advantages of this simple probe protrudes into the receptacle as before. The impedance of a two-wire line can be realized relatively high, e.g. about 250Ω, in particular when the latter is structured asymmetrical (i.e. the wire diameters are different) on a less loaded cross section area. Likewise, however, on the same restricted cross section area impedances of <100Ω are possible with the two-wire line.

A further embodiment of the invention consists in improving through an attenuation of the wave within the feedthrough the impedance matching of the coaxial line, for example, having a small cross section area, to the single line protruding into the receptacle.

This lossy matching which is in principle known, can be realized for the high-frequency feedthrough either by building-in a discrete ohmic resistance or by using a wave-attenuating material as the line dielectric. As a preferred example of realization, a material having a fine distribution of conductive pigments within a filler material is to be mentioned, such as, for example, fine graphite powder admixed to a teflon mass. By the volume, the shape and the conductivity of the wave-attenuating material, the desired impedance matching may thereby be optimized. This solution principle hence does not basically reside on a first parallel connection of the impedance of the probe and the ohmic resistor and/or the resistor formed by the wave-attenuating material. This first parallel connection is in turn connected in parallel with the impedance of the coaxial line of the guiding element and the carrier element. In summary, a parallel connection of the impedance of the probe, the discrete ohmic resistor and/or the wave-attenuating material and the impedance of the coaxial line is created in the zone of the outlet point.

The wave-attenuation within the feedthrough of course causes an amplitude reduction to occur with the filling product reflection to be evaluated, but as compared thereto, the interfering echo at the connection point between the feedthrough and the single line is reduced in a stronger manner, so that in toto a more favorable ratio between the useful echo and the interfering echo is achieved. This method of lossy matching may be applied in an advantageous manner to the coaxial feedthroughs known from prior art as well as to the above-described feedthrough having a two-wire line.

A further embodiment of the invention consists in matching the relatively low impedance of the waveguide within the feedthrough and the relatively high impedance of the single-line probe to each other by means of a high-frequency transformer. Such an impedance transformation by means of a transformer is in principle known. The impedance from the input to the output of the transformer changes in a square-law manner relative to the voltage transmission ratio or the winding ratio. In the case of the feedthrough to be optimized, the transformer, however, has to be mounted at the location of the existing impedance leap, i.e. at the transition of the feedthrough to the single line. A solution for this is to support the single line insulated within the feedthrough and to connect the transformer with the starting end of the metallic single line close to the end of the feedthrough. By modifying the transformer's winding ratio, a matching of various, theoretically arbitrary input and output impedances can be achieved.

In this embodiment of the invention, the impedance leap including the therewith associated disadvantages is so to speak "prevented" from occurring by the high-frequency transformer. In contrast to the embodiment as per FIG. 2, in which the matching of the impedances at the outlet point is achieved in that the impedance within the feedthrough is substantially increased, and namely towards the higher impedance of the probe, here, the impedance within the feedthrough has not to be substantially changed. Now, a mutual impedance matching is "enforced" by the high-frequency transformer.

SHORT DESCRIPTION OF THE DRAWINGS

Figure 2:
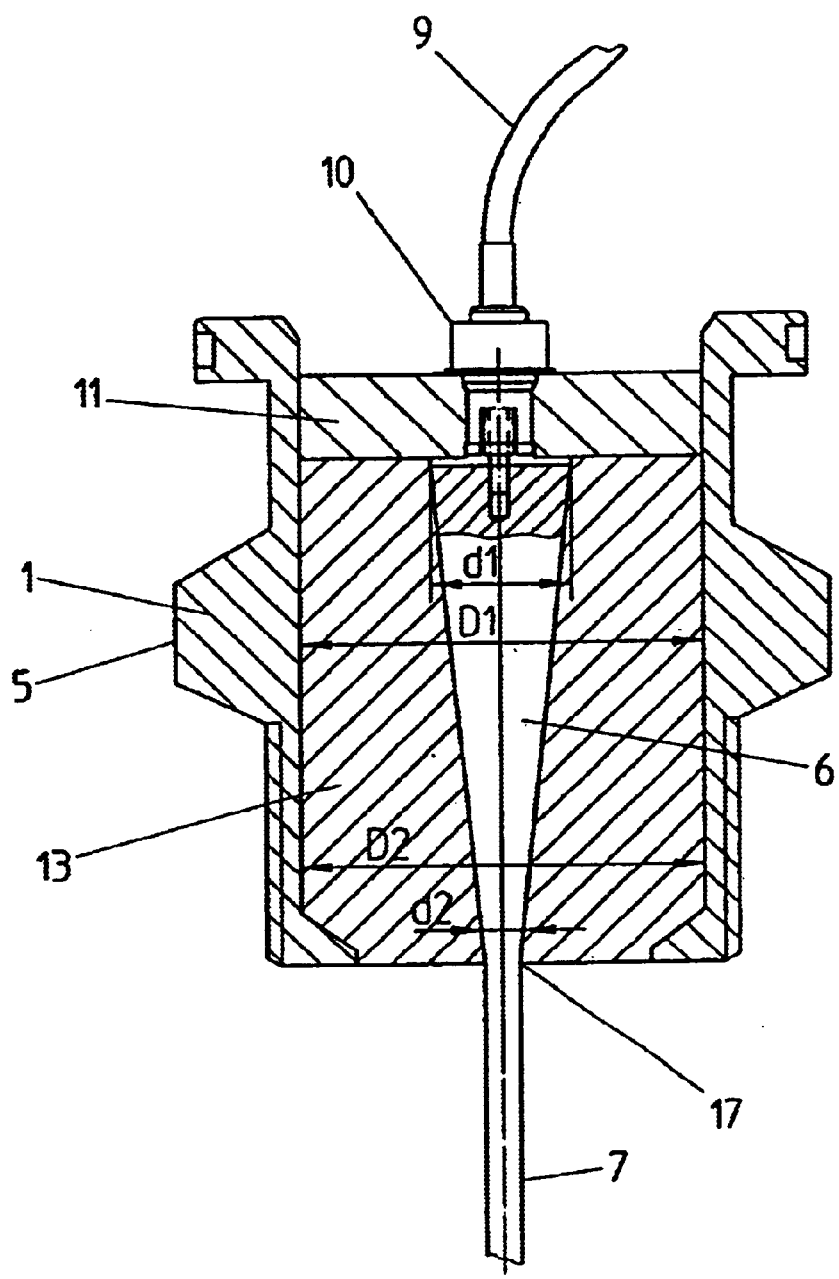
Figure 3:
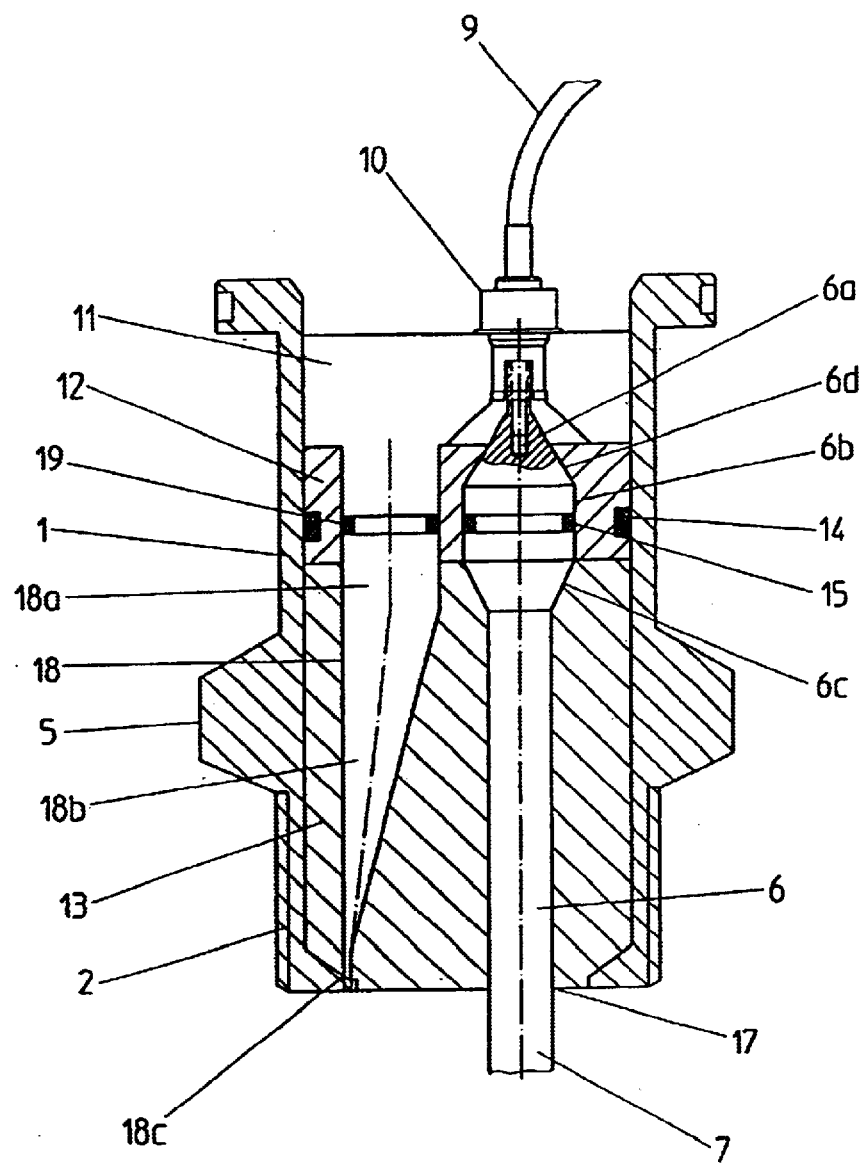
Figure 4:
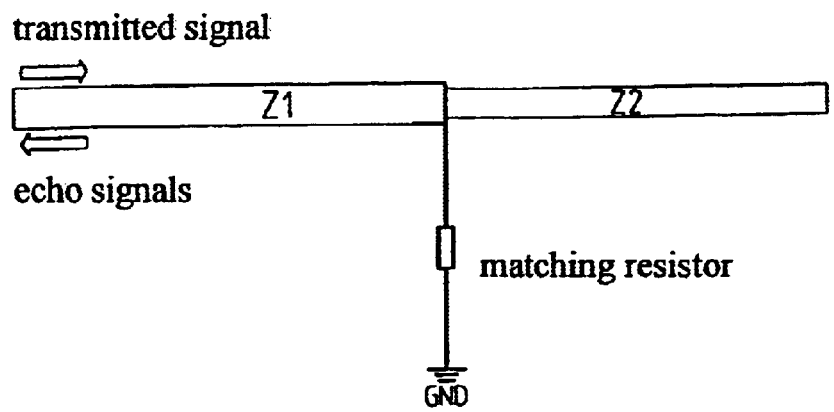
Figure 5:
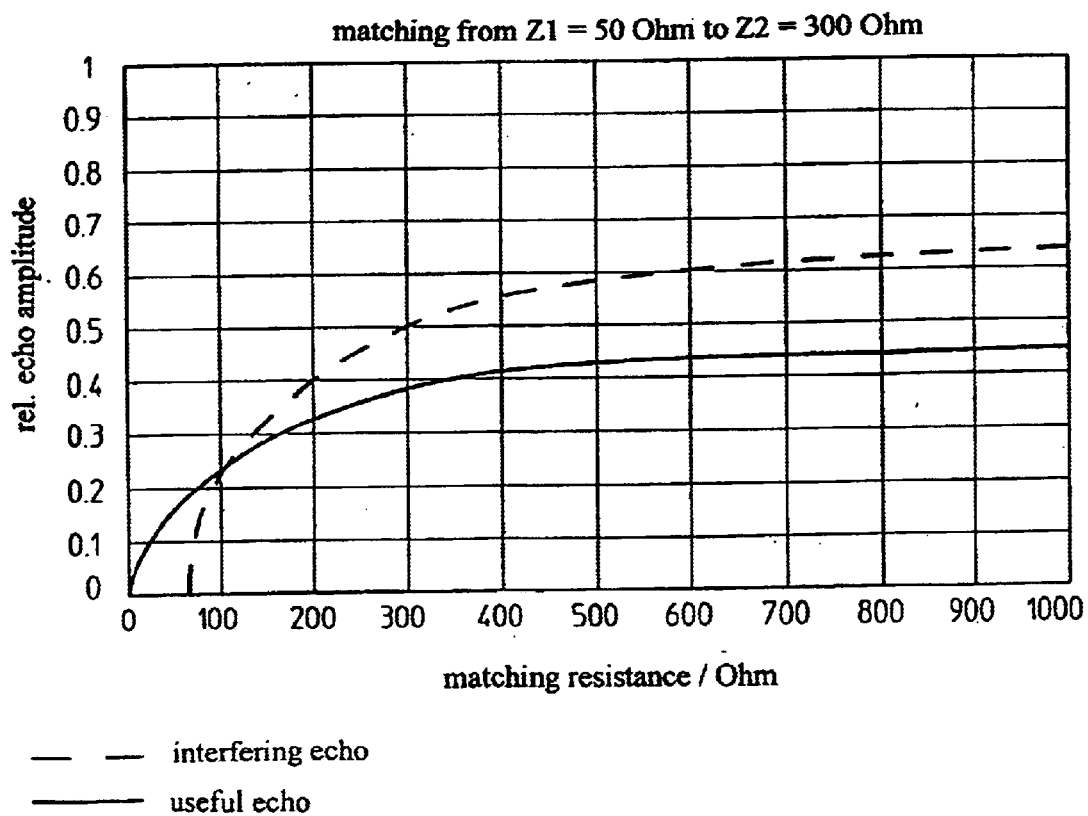
Figure 6:
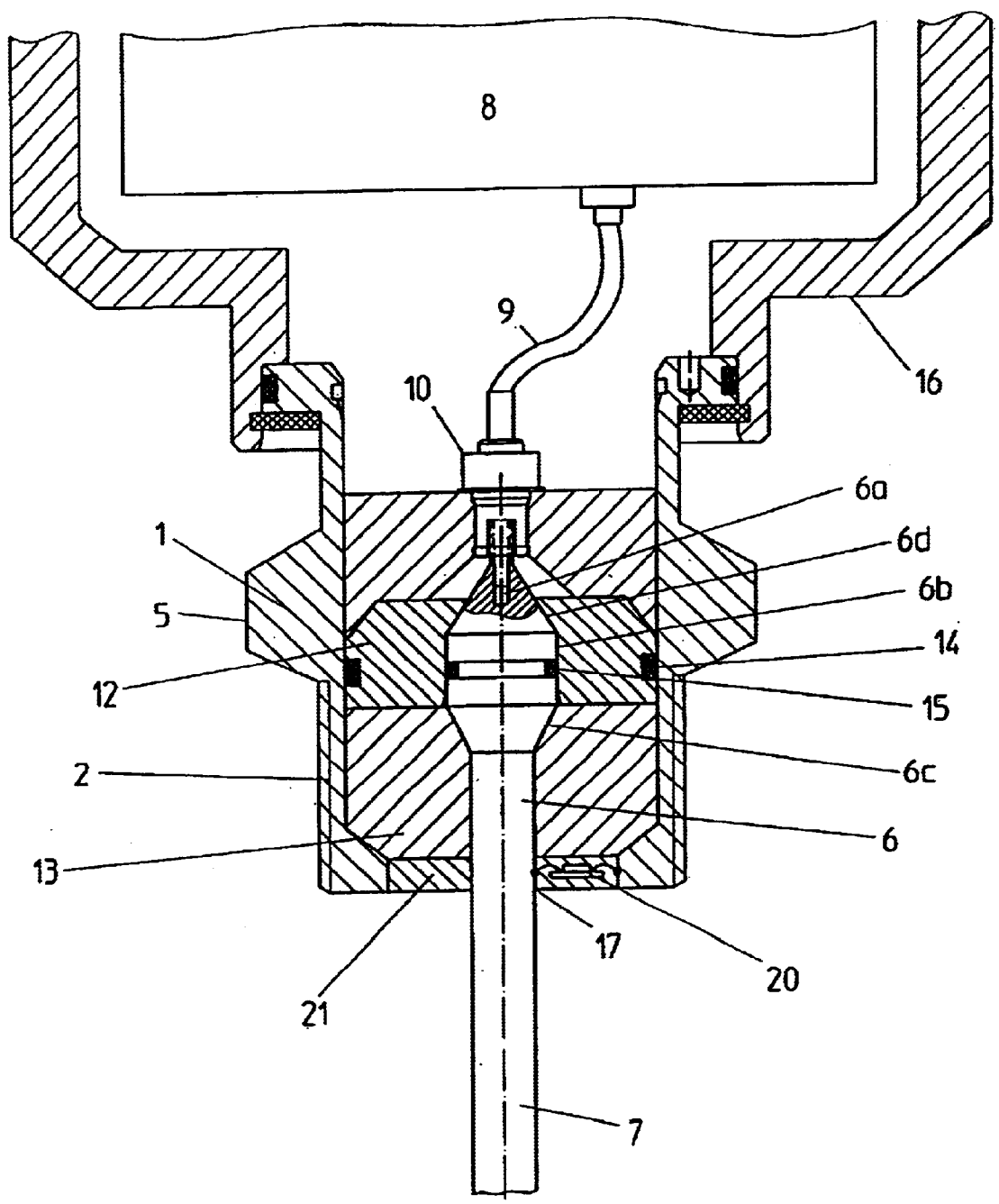
Figure 7:
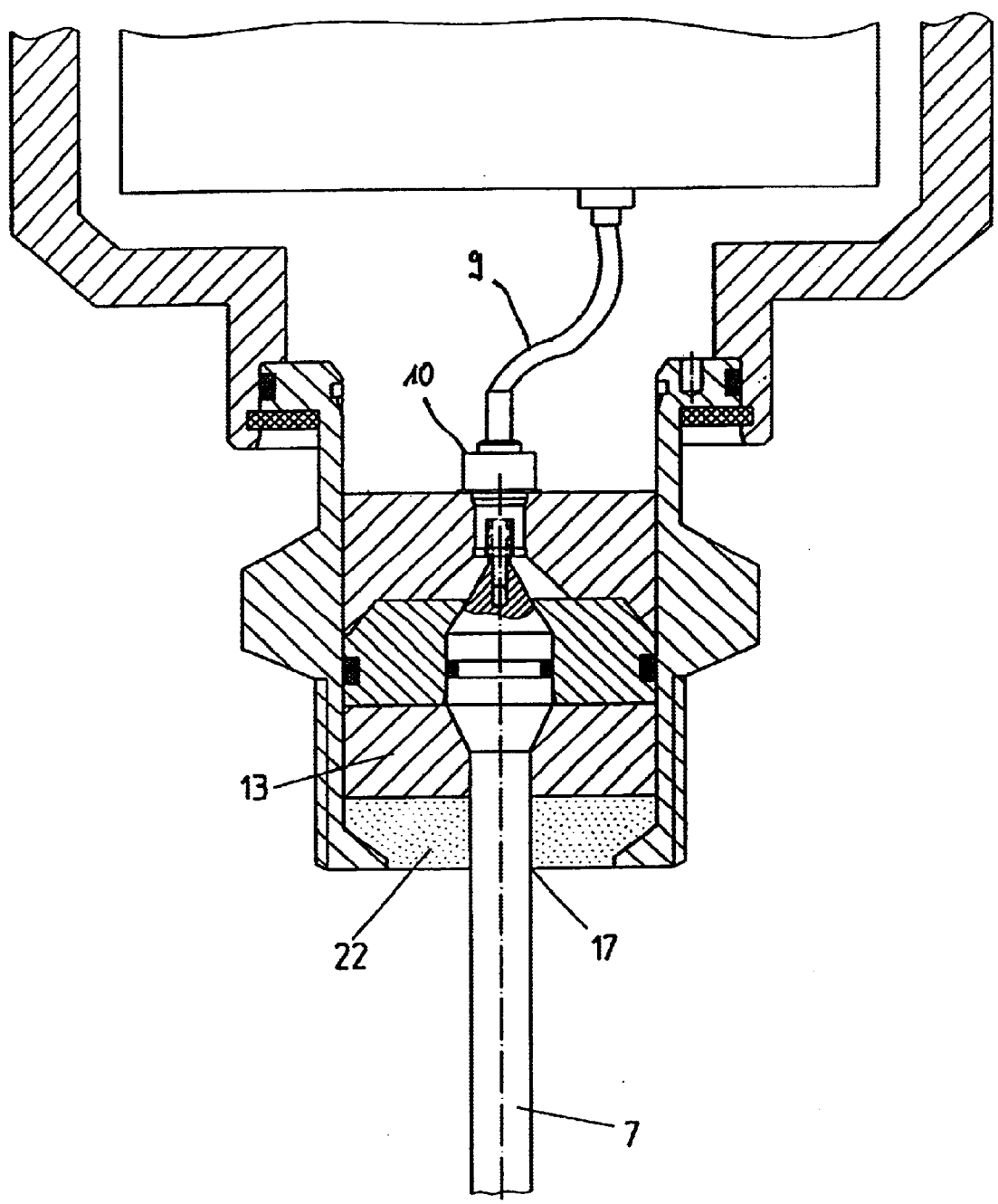
Figure 8:
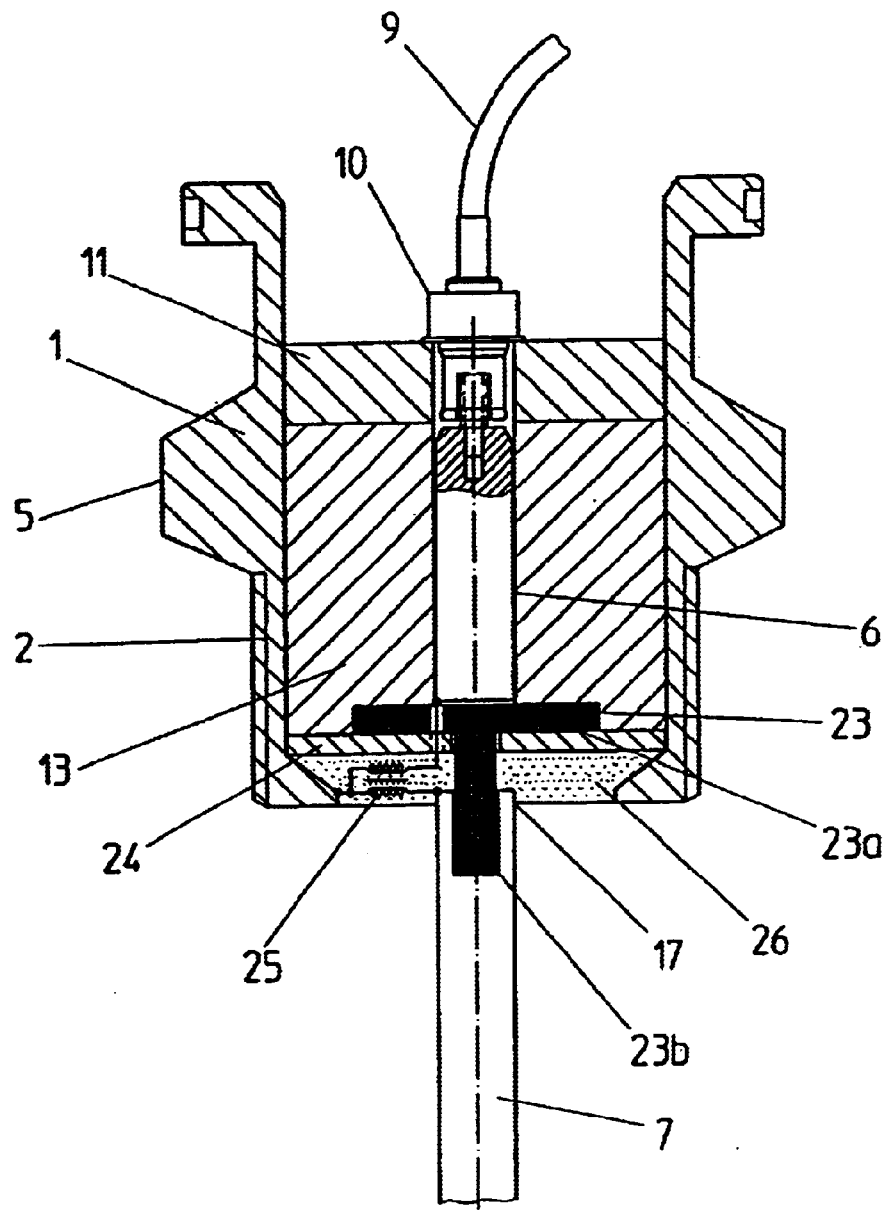
Figure 9:
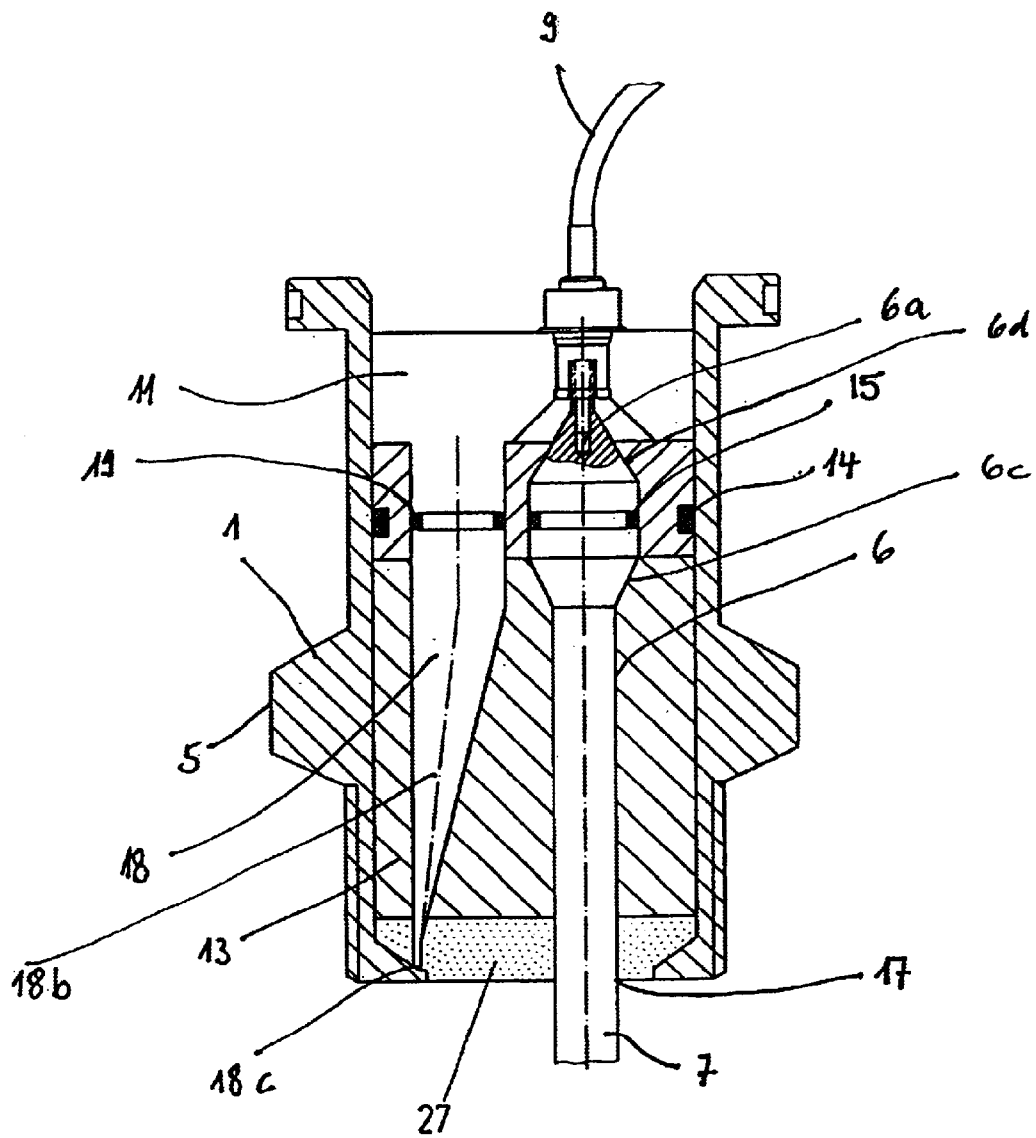

In the following, for the further explanation and better understanding, several embodiments of the invention are described and explained in detail with reference to the attached drawings. Therein shows:

FIG. 1 a high-frequency feedthrough for a single-line level metering probe according to prior art, FIG. 2 a first embodiment of an inventive high-frequency feedthrough for a single-line level metering probe having a coaxial line with a variable diameter ratio between the inner and outer conductor, FIG. 3 a second embodiment of an inventive high-frequency feedthrough for a single-line level metering probe having a two-wire line restricted to the feedthrough, FIG. 4 a diagram of a lossy matching, FIG. 5 an exemplary diagram for determining the amplitude of the useful and the interfering echo in a lossy impedance matching according to the diagram of FIG. 4, FIG. 6 a third embodiment of an inventive high-frequency feedthrough for a single-line level metering probe with a lossy impedance matching by means of a discrete resistor, FIG. 7 a fourth embodiment of an inventive high-frequency feedthrough for a single-line level metering probe with a lossy impedance matching by means of a wave-attenuating material, FIG. 8 a fifth embodiment of an inventive high-frequency feedthrough for a single-line level metering probe having a high-frequency transformer for impedance matching, FIG. 9 a sixth embodiment of an inventive high-frequency feedthrough for a single-line level metering probe, in which two of the above-described solution variants are combined with each other.

DESCRIPTION OF PREFERRED
EMBODIMENTS OF THE INVENTION

The high-frequency feedthrough according to prior art shown in FIG. 1 comprises a carrier element 1, usually made of metal, and which can be screwed into an opening 3 of the receptacle cover 4 provided with a corresponding internal thread by means of an external thread 2 provided in the lower part of carrier element 1. For being mounted, carrier element 1 has an external hexagon 5. Coaxially to said carrier element 1, the feedthrough has a guiding element 6 likewise made of metal. Same connects the single-line probe 7 protruding into the receptacle with the plug-in terminal 10, which in turn is connected with the electronic unit 8 through coaxial cable 9. Plug-in terminal 10 has a resilient pin 10a being received in a contacting manner by a bore 6 at the end of guiding element 6. The outer housing 10b of plug-in terminal 10 contacts metal disk 11 via springs not shown in detail, which disk 11 being in turn mechanically and electrically secured to carrier element 1. By a corresponding selection and dimensioning of the various components of the feedthrough, it can be achieved that the line impedance of coaxial line 9 is carried on matched to the coaxial line configuration of the feedthrough, which essentially consists of carrier element 1 and guiding element 6.

For the mutual insulation and mechanical fixation, the interspace between guiding element 6 and carrier element 1 is filled to a large extent with non-conductive insulation elements 12 and 13. For receiving pressure and tensile forces, guiding element 6 has a thickened portion 6b at probe 7 followed by conical portions 6c and 6d. These transmit forces acting from the receptacle towards the insulation elements 12 and 13, which in turn are again supported by carrier element 1 and metal disk 11. Sealing rings 14 and 15 provide for gases being prevented from penetrating from the inner receptacle space through the feedthrough to the outside. At its upper end, the feedthrough is connected with the housing 16 of the electronic unit, which here is only outlined in part.

Inside the electronic unit 8, for example, a pulse-shaped transmitting signal is generated, which reaches the single-line probe 7 guided via coaxial cable 9, plug-in terminal 10 and the coaxial feedthrough. At the connecting point 17 between guiding element 6 and probe 7, the line impedance for this construction inevitably changes in a relatively discontinuous manner. Starting from the fact that the impedance of the coaxial line is usually at 50Ω, and that the coaxial feedthrough maintains this impedance to a large extent, an impedance leap from said 50Ω to about 300Ω arises at the connection point or outlet point 17. Caused by this fact, a major part of the transmitted signal is reflected back at this point to electronic unit 8. The remaining wave portion propagates along probe 7 until the surface of the filling product. There, depending on the dielectric constant of the filling product, a further part of the wave is reflected. The part, which is now still remaining, penetrates into the filling product, and is reflected at the probe end or is partially absorbed by the filling product's attenuating properties. The echoes reflected back from connection point 17, the filling product surface and possibly the probe end are received in electronic unit 8, processed and evaluated such as it is well known from prior art. Since the interfering echo from connection point 17 can be distinctly stronger than the useful echo from the filling product surface, the latter can no longer be definitely identified and evaluated when the level comes close to connection point 17.

An improvement of this minimum distance to be observed can be achieved by means of an inventive feedthrough according to a first embodiment such as it is shown in FIG. 2. In FIG. 2, components corresponding to those of FIG. 1 are designated with the same reference numerals. Guiding element 6 here has a continuously reducing diameter d, whereas the inner diameter D of the carrier element 1 remains constant to a large extent. The thereby formed coaxial line can be realized so that, following the connector 10, it has an impedance substantially equal to just this connector 10 and to feed line 9. This becomes possible with an appropriate selection of the diameter ratio D1/d1 under simultaneous observation of the dielectric constants of insulation element 13.

In the proximity of connection point 17, the diameter ratio D2/d2 has changed in such a manner that the therefrom resulting impedance of the coaxial line is drawn even closer to the impedance of the single line 7 or equals same. The result of this matching is a reduction of interfering reflections from connection point 17 and a simultaneous amplitude increase of the reflection from the filling product surrounding the single line. This continuous impedance matching by means of the coaxial line within the feedthrough may also be replaced, if required, by several stepped impedance modifications. The finer the stepping, the more reflection-free the matching will work. Instead of changing diameter d of guiding element 6, inner diameter D of carrier element 1 or both together can likewise be modified correspondingly. It is equally possible to modify the dielectric constant of insulating element 13 at a constant diameter ratio D/d in a continuous or stepped manner so that the impedance of the coaxial line becomes varied.

A second embodiment of an inventive feedthrough is illustrated in FIG. 3. Guiding element 6 here is no longer located centrally within carrier element 1 but displaced from the center so that a second guiding element 18 can be accommodated alongside. This second metallic guiding element 18 is mechanically and electrically connected with the metal disk 11, and therewith obtains a conductive connection with the outer conductor of coaxial cable 9. Said guiding element 18 has a cylindrical portion 18a sealed through a sealing ring 19, and a tapered portion 18b terminating in a tip 18c. Together with guiding element 6, it forms a two-wire line or parallel-wire line. The spacing and diameter of portion 18b thereby changes continuously relative to guiding element 6. The two-wire line formed this way guides the wave through the feedthrough. The impedance thereof is determined by the mutual spacing and diameter of the two conductors. The higher the asymmetry and the more important the mutual spacing, the higher is the impedance. By an appropriate selection of the distance and diameter course of the second guiding element 18, a continuous impedance modification of the parallel-wire line can be realized from values of <100Ω up to values of >300Ω. Therewith, the impedance leap at connection point 17 may be clearly reduced, thereby reducing the amplitude of the associated interfering echo, and in toto a smaller minimum distance of the filling product to the feedthrough can be realized.

For keeping the end of the two-wire line or the end of the second guiding element 18c from generating an additional interfering echo, it can be short-circuited with carrier element 1 as shown in FIG. 2. By a differing echo polarity of the echo from the short-circuit and a possibly remaining reflected portion of the wave at connection point 17, which due to the transition from a low impedance to a high impedance is closer to the open electric circuit, these two portions are allowed to mutually compensate and to therewith further reduce the resulting interfering echo.

Alternatively to the short-circuit of end 18c, same can also be configured in an electrically wave-absorbing manner by an ohmic connection to carrier element 1, so as to prevent additional reflections of the wave from arising. An example of such an ohmic connection is a low-inductivity SMD resistor in the order of 200Ω to 500Ω.

In case it is not quite successful to set up within the feedthrough the part of the parallel-wire line facing away from the receptacle by determining the geometry in its impedance so that same corresponds relatively well with that of coaxial cable 9 and plug-in connection 10, a high-frequency capable transformer can be built in directly downstream of plug-in connection 10. The latter transforms the signal arriving through the coaxial system of cable and plug-in connection to the two-wire system consisting of the two guiding elements 6 and 18. The voltage transformation also means at the same time an impedance transformation, and therewith results in the possibility of matching various line impedances. Suitable transformers having a specific design and suitable ferrite material are commercially available. The corresponding circuit arrangement is well known to the skilled person, for which reason it will not be considered in detail here.

Another approach for improving impedance matching between the feedthrough and the single-line probe resides as mentioned in the parallel connection of a lossy or wave-attenuating component. This basic method is known to the skilled person. In FIG. 4, an example is shown, in which a first line comprising wave resistor Z1 is connected with a second line comprising wave resistor Z2, which in this case is of a higher resistance. The impedance leap created at the connection point can be reduced or even completely avoided by the parallel connection of the matching resistor. For the transmitted signal arriving via the first line, an impedance results at the connection point, which is calculated from the parallel connection of line resistor Z2 and matching resistor. Therewith, an ideal impedance matching can be realized, however, linked to a loss of the signal amplitude of the transmitted signal carried-on in the second line. In other words, this kind of matching has the effect of clearly reducing or completely avoiding the interfering echo from the connection point to the detriment of the amplitude of the useful echo from the filling product surface generated on the further signal path.

In FIG. 5, it is shown in a diagram for the example of a first line with Z1=50Ω and a second line with Z2=300Ω, in which way the amplitudes of the useful and the interfering echo change at various matching resistances. The amplitudes are illustrated relative to the transmitting signal amplitude. The interfering echo designates the reflection from the connection point of the two lines, the useful echo designates in this case the total reflection of the wave at the end of the second line. From the diagram, it can be seen that with a decreasing matching resistance, the amplitude of the interfering echo decreases faster than that of the useful echo. In the example shown, the interfering echo is completely eliminated at the matching resistance of 60Ω, whereas the useful echo still has a relative amplitude of 0.17. With the availability of a sufficient transmitting signal amplitude, sufficiently high useful echoes ensue despite the loss, whereas the ratio of useful echo and interfering echo is clearly improved.

In FIG. 6, it is shown in which way the method of lossy matching can be applied to the prior art feedthrough of FIG. 1. Corresponding components are again designated with the same reference numerals as in FIG. 1. In addition to prior art, a matching resistor 20 is built in close to connection point 17 in the inventive feedthrough as per FIG. 6. This can be, for example, a low-inductivity SMD resistor soldered on a circuit board and being connected via short lines, for one, with guiding element 6 and, for another, with carrier element 1. For protecting resistor 20 from influences of the receptacle atmosphere, it is cast into a protective layer 21. The value of the matching resistance can be selected according to the aspects which ratio between the useful echo and the interfering echo is desired, and to which extent the reduced useful echo amplitude can be permitted at the same time. The basic correlations have already been described in conjunction with the diagram of FIG. 5. Instead of the short lines, the establishment of a flexible contact between circuit board and carrier element or guiding element is possible in an advantageous manner. For this purpose, the circuit board is, for example, configured ring-shaped and built in concentrically to the guiding element. The circuit board comprises on its outer and inner edge each a likewise ring-shaped conducting track. The surface-soldered SMD resistor is connected with the outer ring-shaped conducting track with its one contact terminal, and with the inner ring-shaped conducting track with its other contact terminal. The establishment of the contacts are, for example, realized through a first ring-shaped spiral spring butting against the outer conducting track and being simultaneously in contact all around with the inner wall of the carrier element, and through a second ring-shaped spiral spring butting against the inner conducting track and being simultaneously in contact all around with the outer wall of the guiding element. This kind of contact establishment allows certain mutual displacements of the parts to be contacted, for example, due to temperature expansions of the materials. Instead of a single SMD resistor, however, two or more resistors can also be connected arbitrarily in series or in parallel, so as to realize arbitrary resistance values beyond the usual standard values, for one, and to reduce the feed line inductivity by parallel connection, for another. Moreover, a circuit structure on a ceramic or PTFE substrate offers itself in this place with respect to temperature resistance. Instead of the discrete resistors, the circuit components can moreover be applied on the substrate according to the thick film or thin film technology.

In FIG. 7, an alternative embodiment of the lossy matching of the feedthrough is illustrated. Instead of the resistor of FIG. 6, a wave-attenuating layer 22 is provided here directly following connection point 17. As an example for materials being able to constitute such a layer, a distribution of conductive pigments in teflon or a distribution of graphite powder in teflon is to be mentioned here. By the shape, thickness and nature of the material of the wave-attenuating element 22, the most favorable compromise between the elimination of the interfering echo and attenuation of the useful echo can be realized in a manner analogous to the selection of the matching resistance value. For example, by a tapered shape of element 22, the boundary surface to insulating element 13 can be configured so that a smooth transition arises there for the wave propagation without additional reflections.

A further example of realizing a matching by means of a high-frequency transformer is shown in FIG. 8. Guiding element 6 again constitutes together with carrier element 1 a coaxial line carrying on, for example, the impedance of cable 9 and plug 10 in a reflection-free manner. Single-line 7 only protrudes slightly from connection point 17 into the feedthrough. Guiding element 6 and single line 7 are not directly connected to each other. On the contrary, an insulating holding element 23 consisting, for example, of a disk 23a and a pin 23b, is built-in between the two guiding elements 6 and 7. Pin 23b provided with an external thread, is, for example, screwed into an internal thread of single line 7. Holding element 23 is supported, for example, by a metallic disk 24 transferring the tensile forces arising at single line 7 to carrier element 1. Between the end of the coaxial line formed by guiding element 6 and carrier element 1, and the beginning of single line 7, a high-frequency transformer 25 is electrically connected. The winding ratio thereof is so dimensioned that it transforms the impedance of single line 7 to the impedance of the feedthrough-internal coaxial line, this means e.g. from 300Ω to 50Ω, which corresponds to a winding ratio of approximately 1:2.45. For protecting transformer 25 from influences of the receptacle atmosphere, same is embedded in casting material 26.

Finally, FIG. 9 shows an example of a combination of two above-described basic solutions for improving the matching. The feedthrough construction having an internal parallel-wire line as per FIG. 3 now comprises an additional element 27 consisting of a wave-attenuating material, and which exhibits, in analogy to disk 22 of FIG. 7, an impedance matching effect at a simultaneous reduction of the amplitude of the useful signal. By varying the geometry of the two-wire line, as well as the geometry and the nature of the material of element 27, the effects of both of the matching measures are to be tuned to each other in a manner obvious to the skilled person that the result is as close as possible to the ideal of the lowest interfering echo and the highest useful echo.

Further combinations of the various elements of the aforedescribed matching methods are equally possible and obvious to the skilled person, without them being listed here in a complete manner. For example, the two-wire solution of FIG. 3 can be combined with the impedance matching of FIG. 6, or the configuration including a transformer mentioned in conjunction with the two-wire solution, is applicable to a solution with a lossy matching, as well.

What is claimed is:

1. A combination of a feedthrough element for an electric high-frequency signal in a TDR level metering device, and a probe for guiding said high-frequency signal from the feedthrough element to a surface of a filling product to be measured and back, the probe having a first impedance, wherein the feedthrough element comprises:

a guiding element having an inlet point for receiving the electric high-frequency signal and an outlet point at which the electric high-frequency signal is transmitted to the probe, a one-part or multipart mechanical carrier element, a one-pail or multipart insulation present between the carrier element and the guiding element, an attenuating element adapted to attenuate an electromagnetic wave, the attenuating element being present in a zone of the outlet point and being adapted such that the impedance of the feedthrough element and the first impedance of the probe following the outlet point are substantially matched to each other at said outlet point.

2. The combination of claim 1, wherein the impedance at the outlet point for being matched to the impedance of the probe following the outlet point, is substantially higher than the impedance at the inlet point.

3. The combination of claim 1, wherein the guiding element is coaxially arranged to the carrier element.

4. The combination of claim 1, wherein the impedance continuously changes from the inlet point to the outlet point.

5. The combination of claim 1, wherein the impedance changes from the inlet point to the outlet point in a stepped manner.

6. The combination of claim 4 or 5, wherein the inner diameter of the carrier element changes from the inlet point to the outlet point.

7. The combination of claim 4 or 5, wherein the outer diameter of the guiding element decreases from the inlet point to the outlet point.

8. The combination of claim 7, wherein the guiding element has at least section-wise a tapered shape.

9. The combination of claim 1, wherein the carrier element has at least section-wise a conical inner contour.

10. The combination of claim 1, wherein the dielectric constant of the insulation changes from the inlet point to the outlet point.

11. The combination of claim 1, wherein the attenuating element adapted to attenuate an electromagnetic wave is present between the carrier element and the guiding element.

12. The combination of claim 11, wherein the attenuating element contacts the outlet point.

13. The combination of claim 11, wherein the attenuating element comprises mostly a tapered shape.

14. The combination of claim 11, wherein the attenuating element comprises a substantially cylindrical shape.

15. The combination of claim 1, wherein at least one additional guiding element is present and completely within the feedthrough element.

16. A combination of a feedthrough element for an electric high-frequency signal in a TDR level metering device, and a probe for guiding said high-frequency signal from the feedthrough element to the filling product surface of a filling product to be measured and back, wherein the feedthrough element comprises a guiding element having an inlet point for feeding the electric high-frequency signal into the feedthrough element, and an outlet point at which the electric high-frequency signal is transmitted to the probe meant for guiding said high-frequency signal, a one-part or multipart mechanical carrier element, and a one-part or multipart insulation present between the carrier element and the guiding element, wherein the impedance of the feedthrough element and the impedance of the probe following the outlet point are substantially matched to each other at said outlet point,
wherein an element adapted to attenuate an electromagnetic wave is present in a zone of the outlet point between the carrier element and the guiding element,
wherein the wave-attenuating element is a material including a mixture of conductive pigments embedded in an insulating filler material.

17. The combination of claim 16, wherein the wave-attenuating material fills the interspace between the guiding element and the carrier element at least in part.

18. A combination of a feedthrough element for an electric high-frequency signal in a TDR level metering device, and a probe for guiding said high-frequency signal from the feedthrough element to the filling product surface of a filling product to be measured and back, wherein the feedthrough element comprises a first guiding element having an inlet point for feeding the electric high-frequency signal into the feedthrough element, and an outlet point at which the electric high-frequency signal is transmitted to the probe meant for guiding said high-frequency signal, a one-part or multipart mechanical carrier element, and a one-part or multipart insuiation present between the carrier element and the first guiding element, wherein the impedance of the feedthrough element and the impedance of the probe following the outlet point are substantially matched to each other at said outlet point,
wherein at least one additional guiding element is present and adjacent the first guiding element,
wherein the spacing and/or the diameter ratio of the two guiding elements change at least on a partial length of the feedthrough element.

19. A combination of a feedthrough element for an electric high-frequency signal in a TDR level metering device, and a probe for guiding said high-frequency signal from the feedthrough element to the filling product surface of a filling product to be measured and back, wherein the feedthrough element comprises a first guiding element having an inlet point for feeding the electric high-frequency signal into the feedthrough element, and an outlet point at which the electric high-frequency signal is transmitted to the probe meant for guiding said high-frequency signal, a one-part or multipart mechanical carrier element, and a one-part or multipart insulation present between the carrier element and the first guiding element, wherein the impedance of the feedthrough element and the impedance of the probe following the outlet point are substantially matched to each other at said outlet point,
wherein at least one additional guiding element is present and adjacent the first guiding element,
wherein the additional guiding element at its end is connected with the carrier element through a resistor.

20. A combination of a feedthrough element for an electric high-frequency signal in a TDR level metering device, and a probe for guiding said high-frequency signal from the feedthrough element to the filling product surfacc of a filling product to be measured and back, wherein the feedthrough element comprises a guiding element having an inlet point for feeding the electric high-frequency signal into the feedthrough element, and an outlet point at which the electric high-frequency signal is transmitted to the probe meant for guiding said high-frequency signal, a one-part or multipart mechanical carrier element, and a one-part or multipart insulation present between the carrier element and the guiding element, wherein a discrete ohmic resistor is present, which is selected so that the resulting impedance from the parallel connection of the probe impedance and tile resistor is substantially matched at the outlet point to the impedance of the coaxial line fonned by the guiding element and the carrier element.

21. The combination of claim 20, wherein the ohmic resistor is present in a zone of the outlet point between the carrier element and the guiding element.

22. The combination of claim 20, wherein the ohmic resistor is embedded in a casting material.

23. The combination of claim 20, wherein an element adapted to attenuate an electromagnetic wave is present in the zone of the outlet point between the carrier element and the guiding element.

24. The combination of claim 23, wherein the attenuating element is arranged in proximity to the outlet point.

25. The combination of claim 23, wherein the wave-attenuating element comprises a substantially cylindrical shape.

26. The combination of claim 23, wherein the wave-attenuating element comprises mostly a tapered shape.

27. The combination of claim 23, wherein at least one additional guiding element is adjacent the first guiding element and completely within the feedthrough element.

28. The combination of claim 27, wherein the additional guiding element at its end is connected with the carrier element.

29. A combination of a feedthrough element for an electric high-frequency signal in a TDR level metering device, and a probe for guiding said high-frequency signal from the feedthrough element to the filling product surface of a filling product to be measured and back, wherein the feedthrough element comprises a guiding element having an inlet point for feeding the electric high-frequency signal into the feedthrough element, and an outlet point at which the electric high-frequency signal is transmitted to the probe meant for guiding said high-frequency signal, a one-part or multipart mechanical carrier element, and a one-part or multipart insulation present between the carrier element and the guiding element, wherein a discrete ohmic resistor is present, which is selected so that the resulting impedance from the parallel connection of the probe impedance and the resistor is substantially matched at the outlet point to the impedance of the coaxial line formed by the guiding element and the carrier element, wherein an attenuating element adapted to attenuate an electromagnetic wave is present in the zone of the outlet point between the carrier element and the guiding element, wherein the attenuating element is arranged in proximity to the outlet point, and wherein the wave-attenuating element is a material including a mixture of conductive pigments embedded in an insulating filler material.

30. The combination of claim 29, wherein the wave-attenuating material fills the interspace between the guiding element and the carrier element at least in part.

31. A combination of a feedthrough element for an electric high-frequency signal in a TDR level metering device, and a probe for guiding said high-frequency signal from the feedthrough element to the filling product surface of a filling product to be measured and back, wherein the feedthrough element comprises a first guiding element having an inlet point for feeding the electric high-frequency signal into the feedthrough element, and an outlet point at which the electric high-frequency signal is transmitted to the probe meant for guiding said high-frequency signal, a one-part or multipart mechanical carrier element, and a one-part or multipart insulation present between the carrier element and the first guiding element, wherein a discrete ohmic resistor is present, which is selected so that the resulting impedance from the parallel connection of the probe impedance and the resistor is substantially matched at the outlet point to the impedance of the coaxial line formed by the guiding element and the carrier element, wherein at least one additional guiding element is present restricted to the feedthrough element, wherein the spacing and/or the diameter ratio of the two guiding elements change at least on a partial length of the feedthrough.

32. A combination of a feedthrough element for an electric high frequency signal in a TDR level metering device, and a probe for guiding said high-frequency signal from the feedthrough element to the filling product surface of a filling product to be measured and back, wherein the feedthrough element comprises a guiding element having an inlet point for feeding the electric high-frequency signal into the feedthrough element, and an outlet point at which the electric high-frequency signal is transmitted to the probe meant for guiding said high-frequency signal, a one-part or multipart mechanical carrier element, and a one-part or multipart insulation present between the carrier element and the guiding element, wherein a high-frequency transformer is present electrically connecting the carrier element and the guiding element with each other in a zone adjacent the outlet point, and substantially matching the impedances to each other; and wherein the probe is connected to the transformer so that impedances of the probe and the guiding element substantially match.

33. The combination of claim 32, wherein the high-frequency transformer is embedded in an insulating and protecting casting material.

34. A combination of a feedthrough element for an electric high-frequency signal in a TDR level metering device, and a probe for guiding said high-frequency signal from the feedthrough element to the filling product surface of a filling product to be measured and back, wherein the feedthrough element comprises a guiding element having an inlet point for feeding the electric high-frequency signal into the feedthrough element, and an outlet point at which the electric high-frequency signal is transmitted to the probe meant for guiding said high-frequency signal, a one-part or multipart mechanical carrier element, and a one-part or multipart insulation present between the carrier element and the guiding element, wherein at least one second guiding element is present restricted to the feedthrough zone, and whereby the impedance of the feedthrough element and the impedance of the probe following the outlet point are substantially matched to each other at the outlet point.

35. A combination of a feedthrough element for an electric high-frequency signal in a TDR level metering device, and a probe for guiding said high-frequency signal front the feedthrough element to the filling product surface of a filling product to be measured and back, wherein the feedthrough element comprises a guiding element having an inlet point for feeding the electric high-frequency signal into the feedthrough element, and an outlet point at which the electric high-frequency signal is transmitted to the probe meant for guiding said high-frequency signal, a one-part or multipart mechanical carrier element, and a one-part or multipart insulation present between the carrier element and the guiding element, wherein at least one second guiding element is present restricted to the feedthrough zone, wherein the impedance of the feedthrough element and the impedance of the probe following the outlet point are substantially matched to each other at the outlet point, and wherein the spacing and/or the diameter ratio of the two guiding elements change at least on a partial length of the feedthrough.

36. A combination of a feedthrough element for an electric high-frequency signal in a TDR level metering device, and a probe for guiding said high-frequency signal from the feedthrough element to the filling product surface of a filling product to be measured and back, wherein the feedthrough element comprises a guiding element having an inlet point for feeding the electric high-frequency signal into the feedthrough element, and an outlet point at which the electric high-frequency signal is transmitted to the probe meant for guiding said high-frequency signal, a one-part or multipart mechanical carrier element, and a one-part or multipart insulation present between the carrier element and the guiding element, wherein at least one second guiding element is present restricted to the feedthrough zone, wherein the impedance of the feedthrough element and the impedance of the probe following the outlet point are substantially matched to each other at the outlet point, and wherein the additional guiding element at its end is connected with the carrier element through a resistor.

37. A combination of a feedthrough element for an electric high-frequency signal in a TDR level metering device, and a probe for guiding said high-frequency signal from the feedthrough element to the filling product surface of a filling product to be measured and back, wherein the feedthrough element comprises a guiding element having an inlet point for feeding the electric high-frequency signal into the feedthrough element, and an outlet point at which the electric high-frequency signal is transmitted to the probe meant for guiding said high-frequency signal, a one-part or multipart mechanical carrier element, and a one-part or multipart insulation present between the carrier element and the guiding element, wherein at least one second guiding element is present restricted to the feedthrough zone, wherein the impedance of the feedthrough element and the impedance of the probe following the outlet point are substantially matched to each other at the outlet point, and wherein the spacing and the diameter ratio of the two guiding elements continuously change at least on a partial length of the feedthrough.

38. A combination of a feedthrough element for an electric high-frequency signal in a TDR level metering device, and a probe for guiding said high-frequency signal from the feedthrough element to a surface of a filling product to be measured and back, wherein the feedthrough element comprises:

a guiding element having an inlet point for receiving the electric high-frequency signal from a signal source and an outlet point at which the electric high-frequency signal is transmitted to the probe, a one-part or multipart mechanical carrier element, and a one-part or multipart insulation present between the carrier element and the guiding element, and wherein, in a zone of the outlet point between the carrier element and the guiding element, an element is present attenuating the electromagnetic wave so that the impedance at the outlet point of the feedthrough element and the impedance of the probe following the outlet point are substantially matched to each other.

39. The combination of claim 38, wherein the attenuating element is connected at the outlet point.

40. The combination of claim 38, wherein the wave-attenuating element has a substantially cylindrical shape.

41. The combination of claim 38, wherein the wave-attenuating element has mostly a conical shape.

42. The combination of claim 38, wherein the guiding element is coaxially arranged to the carrier element.

43. The combination of claim 38, wherein the impedance continuously changes from the inlet point to the outlet point.

44. The combination of claim 38, wherein the impedance changes from the inlet point to the outlet point in a stepped manner.

45. The combination of claim 38, wherein the inner diameter of the carrier element changes from the inlet point to the outlet point.

46. The combination of claim 38, wherein the outer diameter of the guiding element decreases from the inlet point to the outlet point.

47. The combination of claim 46, wherein the guiding element has at least section-wise a tapered shape.

48. The combination of claim 38, wherein the carrier element has at least section-wise a conical inner contour.

49. The combination of claim 38, wherein the dielectric constant or the insolation changes from the inlet point to the outlet point.

50. The combination of claim 38, wherein at least one additional guiding element is present restricted to the feedthrough zone.

51. A combination of a feedthrough element for an electric high-frequency signal in a TDR level metering device, and a probe for guiding said high-frequency signal from the feedthrough element to the filling product surface of a filling product to be measured and back, wherein the feedthrough element comprises a guiding element having an inlet point for feeding the electric high-frequency signal into the feedthrough element, and an outlet point at which the electric high-frequency signal is transmitted to the probe meant for guiding said high-frequency signal, a one-part or multipart mechanical carrier element, and a one-part or multipart insulation present between the carrier element and the guiding element, wherein in the zone of the outlet point between the carrier element and the guiding element, an element is present attenuating the electromagnetic wave so that the impedance of the feedthrough element and the impedance of the probe following the outlet point are substantially matched to each other at the outlet point, and wherein the wave-attenuating element is a material including a mixture of conductive pigments embedded in an insulating filler material.

52. The combination of claim 51, wherein the wave-attenuating material fills the interspace between the guiding element and the carrier element at least in part.

53. A combination of a feedthrough element for an electric high-frequency signal in a TDR level metering device, and a probe for guiding said high-frequency signal from the feedthrough element to the filling product surface of a filling product to be measured and back, wherein the feedthrough element comprises a guiding element having an inlet point for feeding the electric high-frequency signal into the feedthrough element, and an outlet point at which the electric high-frequency signal is transmitted to the probe meant for guiding said high-frequency signal, a one-part or multipart mechanical carrier element, and a one-part or multipart insulation present between the carrier element and the guiding element, wherein in a zone of the outlet point between the carrier element and the guiding element, an element is present attenuating the electromagnetic wave so that the impedance of the feedthrough element and the impedance of the probe following the outlet point are substantially marched to each other at the outlet point.

wherein at least one additional guiding element is present within the carrier element, and wherein the spacing and/or the diameter ratio of the two guiding elements change at least on a partial length of the feedthrough element.

54. A combination of a feedthrough element for an electric high-frequency signal in a TDR level metering device, and a probe for guiding said high-frequency signal from the feedthrough element to the filling product surface of a filling product to be measured and back, wherein the feedthrough element comprises a guiding element having an inlet point for feeding the electric high-frequency signal into the feedthrough element, and an outlet point at which the electric high-frequency signal is transmitted to the probe meant for guiding said high-frequency signal, a one-part or multipart mechanical carrier element, and a one-part or multipart insulation present between the carrier element and the guiding element, wherein in the zone of the outlet point between the carrier element and the guiding element, an element is present attenuating the electromagnetic wave so that the impedance of the feedthrough element and the impedance of the probe following the outlet point are substantially matched to each other at the outlet point, wherein at least one additional guiding element is present restricted to the carrier element, and wherein the additional guiding element at its end is connected with the carrier element through a resistor.

55. A level metering device for measuring the filling level through the propagation time measurement of a guided electromagnetic wave in the form of a high-frequency signal, comprising:

an electronic unit for generating said electromagnetic wave and for evaluating received echo signals, the electronic unit having a first impedance, connected with said electronic unit, a high-frequency feedthrough element for the electric high-frequency signal, a probe for guiding said high-frequency signal from the feedthrough element to a filling product surface of a filling product to be measured and back, the probe having a second impedance different than the first impedance, wherein the feedthrough element comprises a guiding element having an inlet point for receiving the electric high-frequency signal from the electronic unit, and an outlet point at which the electric high-frequency signal is transmitted to the probe, the inlet point having a third impedance, the outlet point having a fourth impedance, a one-part or multipart mechanical carrier element, a one-part or multipart insulation present between the carrier element and the guiding element, wherein the fourth impedance and the second impedance of the probe following the outlet point are substantially matched to each other at the outlet point, and wherein the third impedance substantially matches the first impedance.

* * * * *